Feb. 12, 1963  D. R. CHASE ET AL  3,077,530
COOKING APPLIANCE
Filed May 6, 1959  3 Sheets-Sheet 1
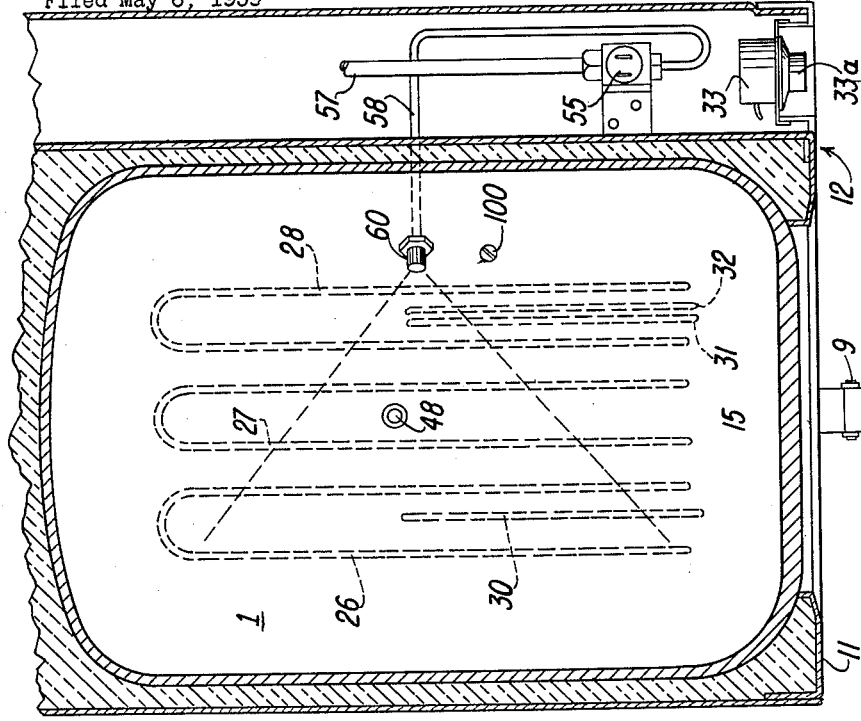
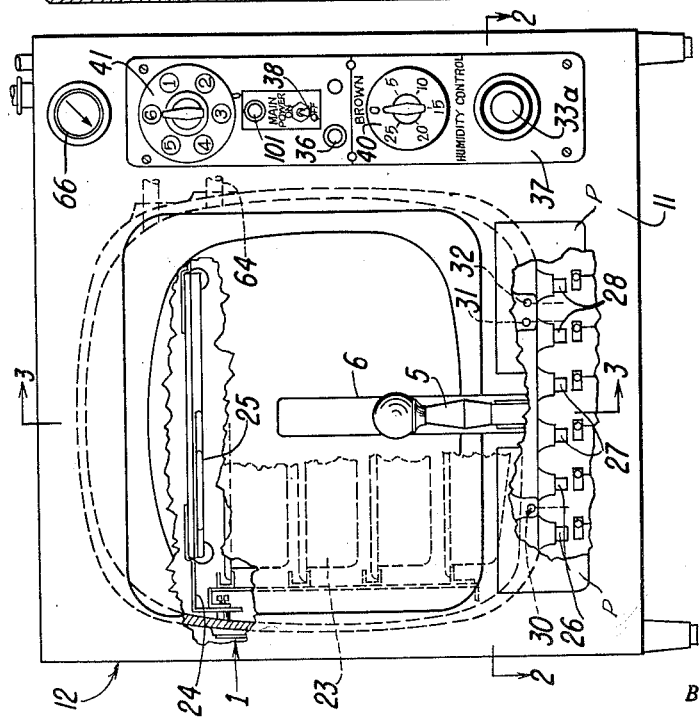
INVENTORS
David R. Chase
Harold A. Michaelis
BY
Andrew G. Hubbard
Atty.

INVENTORS
David R. Chase
Harold A. Michaelis
BY Andrew B. Hubbard
Atty.

INVENTORS
David R. Chase
BY Harold A. Michaelis
Andrew G. Hubbard
Atty.

３,０７７,５３０
Patented Feb. 12, 1963

3,077,530
COOKING APPLIANCE
David R. Chase and Harold A. Michaelis, Elmhurst, Ill., assignors to General Electric Company, a corporation of New York
Filed May 6, 1959, Ser. No. 811,475
7 Claims. (Cl. 219—38)

This invention relates to cooking appliances, and, in particular, to a cooking appliance utilizing steam pressure as a principal cooking medium and having auxiliary radiant heating means which may be employed independently of, or concurrently with, the steam pressure cooking operation.

It is an object of the invention to provide a cooking appliance having a simple and highly efficient method of generating steam pressure within the cooking chamber itself.

It is another object of the invention to provide a steam pressure cooking appliance in which a valve-provided condensate drain is automatically purged with live steam at the commencement and the end of a pressure cooking operation, whereby to keep the drainage system in a clean and sanitary condition at all times.

It is a further object of the invention to provide a steam pressure cooking appliance having means to delay the introduction of water into the appliance for the generation of steam therein, until a steam generating surface within the cooking chamber has reached a temperature sufficiently high to convert the water immediately into steam as the water impinges thereon.

It is a further object of the invention to provide a pressure cooking apparatus in which the steam atmosphere within the cooking chamber can be maintained under preselected humidity conditions, whereby to produce optimum cooking results for foodstuffs having different physical characteristics such as mass, inherent water content, leafy or bud-like structure, and the like.

It is a still further object of the invention to provide a cooking appliance having improved operational and safety controls.

In a presently preferred embodiment of the invention, the cooking appliance comprises a pressure chamber arranged to receive trays of foodstuffs for processing therein. The bottom of the chamber accommodates a drain or condensation pan communicating directly with a solenoid-operated drain valve system. Below the condensation pan, the bottom wall of the pressure chamber is of massive construction; and within said bottom wall are housed a plurality of electrical resistance units designed to heat the wall to a temperature at which cold water sprayed against the wall from a nozzle arranged in proximity thereto will be immediately converted into steam. The bottom wall also accommodates the temperature-sensing elements of three thermostats, respectively responsive to the temperature of the bottom wall to maintain the temperature thereof within reasonably close tolerances at either of two widely separated control levels; to the temperature of the bottom wall to delay operation of the water inlet valve until a predetermined bottom wall temperature has been reached; and to the temperature of the bottom wall to interrupt energy to the heating units when said wall temperature exceeds a safe limit. This last-named thermostat is of the noncycling type; it must be manually reset to return the cooker to service. Conventional timer means operates an exhaust valve solenoid and a drain valve solenoid at the termination of a desired cooking interval.

An exposed resistance heating unit in the upper portion of the cooking chamber is controlled by a second conventional timer to provide radiant energy for selected cooking operations.

It is a feature of the invention that the normally closed exhaust valve and drain valve are each held open for an approximately thirty second interval after steam generation begins at the commencement of each time pressure cooking operation. This insures that the chamber will be purged of its air content and that the drain pan and the drain valve connections communicating therewith will be cleansed of juices which for example, may have dripped into said pan from a cooking operation in which only the radiant heating means was used, whereby the cooking chamber and its drainage system will not be contaminated by residue from such previous cooking operation.

Other features and advantages of the invention will be best understood by the following detailed description of a presently preferred embodiment thereof, read in connection with the accompanying drawings in which:

FIG. 1 is a front view of a cooking apparatus embodying the present invention, certain structural portions being broken away to reveal underlying structure;

FIG. 2 is a plan section taken below the drain pan on lines 2—2 of FIG. 1;

Figure 3:
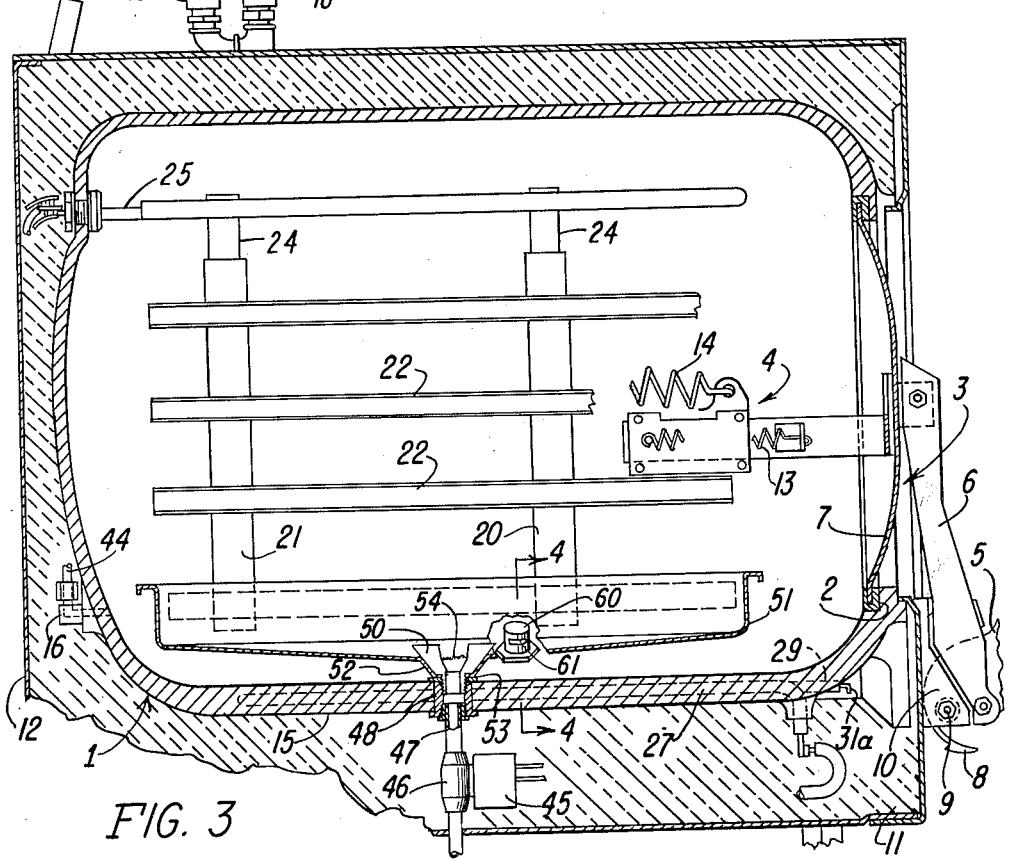
FIG. 3 is a fragmentary side sectional elevation taken on lines 3—3 of FIG. 1.

Referring now to FIGS. 1 and 3, the cooking apparatus embodying our invention comprises a cooking chamber 1 having an access opening 2 arranged to be closed by the latch-provided door structure 3. The door and latching arrangement and the door counterspringing means 4 are described and claimed in detail in the presently pending application of Herbert F. Swanson, S.N. 785,077, filed January 5, 1959, now patent Number 2,966,999, for "Cooking Apparatus," and assigned to our present assignee. This mechanism will not be described in the present application beyond saying that the handle 5 is pivotally connected by means of the link 6 (FIG. 3) to the door 7. The handle has a latching hook 8 which releasably engages a stud 9 extending between the spaced legs 10 of a bracket fixed to a front panel 11 of an outer casing 12. When the handle is rotated clockwise of FIG. 3 to disengage the hook 8 from the stud 9, spring 13 of the counterspringing mechanism draws the door directly rearwardly from the opening, whereupon the counterspring 14 assists in moving the door to a full open position.

Figure 5:
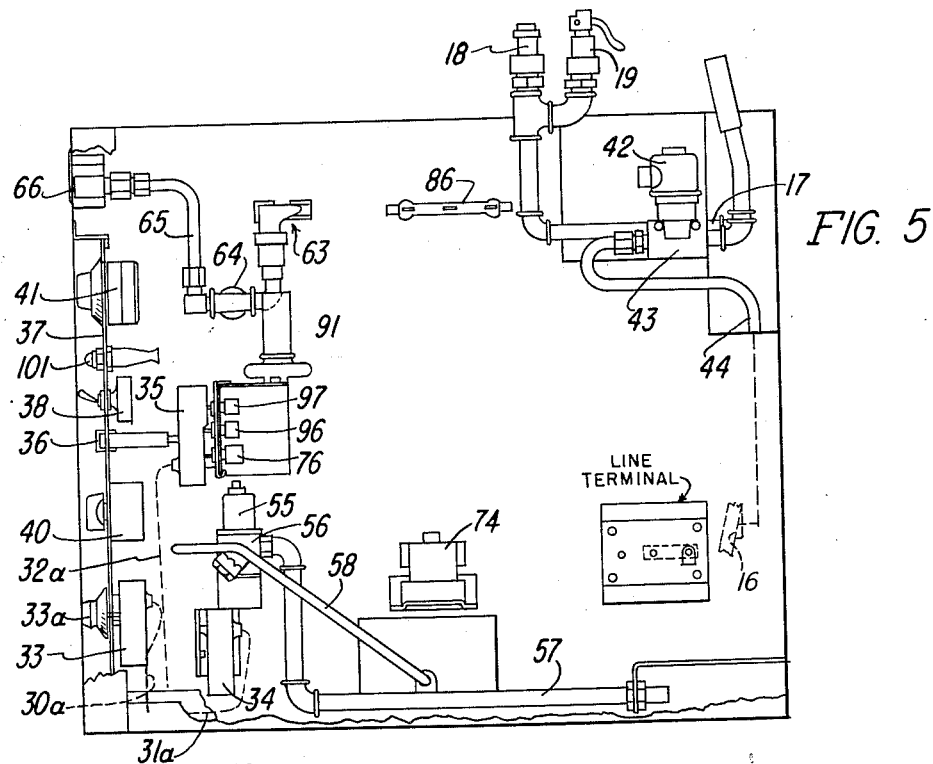
FIG. 5 is a side elevational view with a side casing access panel broken away to show the arrangement of certain of the operating components.

The cooking chamber may be of drawn, welded, or cast metal, having sufficient structural strength to withstand the internal operating pressure of fifteen pounds per square inch (gage) with whatever safety factor is required by codes relating to unfired pressure vessels. In the commercial embodiment of the present invention, the chamber is of cast aluminum and is formed to have a thick, relatively massive, bottom wall 15, subsequently described in greater detail. Said bottom wall has excellent thermal conductivity. The rear wall of the chamber is bossed to accommodate the exhaust fitting 16, whereby the working pressure may be relieved to the atmosphere at the end of the cooking operation, as later described. An upper side wall of the chamber is bossed to accommodate piping 17 serving the operating relief valve 18 and the safety relief valve 19, shown best in FIG. 5. The valve 18 may be of the "popoff" type, set to open at fourteen and three-quarter pounds per square inch, and to close at thirteen and three-quarter pounds per square inch pressure. At each operating pressure, it is expected that the relief valve will have a tolerance of not more than plus or minus one-quarter of a pound per square inch gage. The safety valve 19 is sealed to release at nineteen pounds per square inch gage.

The respective side walls of the chamber are provided with front and rear racks 20, 21 (FIG. 3) supporting trackways 22 which slidably accommodate the cooking pans 23, FIG. 1. It will be understood that the term "pans" is intended to include foraminated as well as solid pans, and wire racks, and the like. Of course, the pans are designed for easy insertion and removal through the door opening. Further, the chamber is provided with suitable structure 24 to fixedly mount an electrical resistance unit 25, arranged in sinuous fashion to comprehend a large area of the upper portion of the chamber. The resistance unit 25 is of the tubular metal sheathed type, as shown, for example in U.S. Patent 2,483,839, granted October 4, 1949, to S. A. Oakley, for "Method of Making Electric Heaters." When energized, the sheath heating unit emits radiant energy for "browning" previously cooked spaghetti, etc., or meat, fish, poultry, or the like, which may have been or are being steam-pressure cooked in the apparatus.

Figure 4:
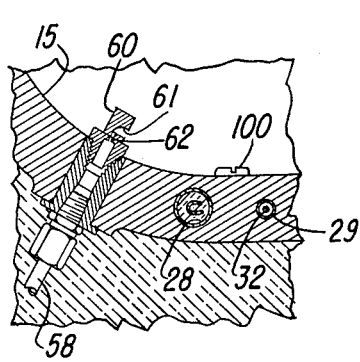
FIG. 4 is a fragmentary section taken through the base of the pressure chamber on lines 4—4 of FIG. 3.

The base wall 15 of the chamber is, in the presently commercial embodiment of the invention, approximately one inch thick for the greater portion of its area, as compared with side, rear, and top wall thicknesses of about five-sixteenths of an inch. This massive base wall accommodates three tubular sheathed resistance heating elements 26, 27, 28 (FIG. 2) which are of the above-noted type and are cast into position. The wall also includes cast-in tubes 29, which snugly accommodate sensing elements 30, 31, and 32, which comprise portions of the capillary tube systems of conventional liquid-filled thermostats, such as shown in Ettinger U.S. Patent 2,260,014 of October 21, 1941. Sensing element 30 and its associated tube system 30a, shown schematically in FIG. 5, comprises part of a conventional cycling thermostat 33, FIG. 5; sensing element 31 and its associated tube system 31a comprises part of a conventional cycling thermostat 34; and sensing element 32 and its associated tube system 32a comprises part of a noncycling, manual reset thermostat 35, of which the manual reset button 36 is on the control panel 37, shown best in FIG. 1. Thermostat 33 has an externally accessible knob 33a by means of which the thermostat may be set to hold the temperature of the bottom wall within plus or minus 10° F. at any temperature between 345° F. and 440° F. Usually, the chef will select either 345° F. or 440° F., depending upon whether a "wet" steam or "dry" steam cooking atmosphere is desired. Thermostat 34 is factory-set to cycle at 305° F., plus or minus 10° F., and thermostat 35 will open its contacts at a temperature within a range of from 550° F. to 575° F. and will remain open until manually reset by pressing the button 36. Thermostat 33 may be termed the "humidity control"; thermostat 34, the "water inlet control"; and thermostat 35, the "safety." It will be noted that the setting temperature of thermostat 34 is substantially above the temperature of saturated steam at 15 pounds per square inch gage. The operational controls and facilities further include a master switch 38, a timing device 40 having an externally accessible knob by means of which the upper heating unit 25 may be energized for periods of up to thirty minutes duration; and a timing device 41 by means of which the cooking operation, later described, may be set for up to sixty minutes duration. As later described, timer 41 controls the solenoid coil 42 of the solenoid-actuated exhaust valve 43, said valve being connected by the tubing 44 to the fitting 16 and thus serving to expel the pressure within the chamber at the end of the cooking operation. Timer 41 also controls the solenoid coil 45 of the drain valve 46, best shown in FIG. 3. The said drain valve is preferably of the "straight through" type and is connected by means of the pipe 47 and threaded fitting 48 to the interior of the chamber. Specifically, the fitting 48 accommodates a wing screw drainage fitting 50, by means of which the drainage or condensation pan 51 is removably affixed to the fitting 48. For example, the pan 51 has a frusto-conical outlet 52, the bottom of which is faced with a resilient gasket 53. The fitting 50 has a similar frusto-conical portion which corresponds to the outlet 52, whereupon when the fitting 50 is inserted into the outlet 52, and the threaded projection of the fitting 50 engaged with the threads of the fitting 48, manual rotation of the fitting 50 will secure the pan 51 tightly on the fitting 48, whereby the pan is firmly secured with its bottom wall spaced above the wall 15 of the chamber. A screen 54 guards the inlet portion of fitting 50. It will be understood that the pan 51 overlies a substantial area of the wall 15, and is arranged to catch and collect juices, condensation, and other liquids from the cooking racks or pans. The drainage fitting and the exhaust fitting 16, being at low levels within the chamber, quickly dispose of the air in the chamber as the steam pressure forces the air down. Thermostat 33 indirectly controls the solenoid coil 55 of the normally closed water inlet valve 56, shown in FIG. 5. Said valve receives cold water from any suitable source (not shown) through the pipe 57 and supplies water to the interior of the chamber by the tube 58, said tube terminating in the spray-nozzle 60, shown best in FIG. 4. The spray-nozzle is arranged within the chamber to produce a fan-like spray which strikes the bottom of the wall 15 wholly below the pan 51 and over substantially the entire area of the bottom wall occupied by the heating unit 26 and the sensing element 30 of the thermostat 33. Because of the large area of the pan and the impingement of water over the bottom wall area below the pan, the pan functions as a baffle to distribute the steam throughout the chamber. It will be noted from FIG. 4 that the roof 61 of the spray fitting is substantially a tangential continuation of the spray orifice 62. This is considered important to insure the proper angle and shape of the spray pattern.

During the cooking operation, the water inlet valve 56 is under the direct control of a switch 63 responsive to the pressure within the chamber. Piping serving the pressure switch communicates with the chamber at the boss 64. Suitable branch tubing 65 serves a conventional pressure gage 66, FIG. 5. The pressure switch 63 opens the energizing circuit of the water inlet valve solenoid at thirteen pounds per square inch gage pressure within the chamber, and it closes the circuit at all pressures below twelve pounds per square inch, whereupon during the cooking operation, water is sprayed against the hot bottom wall 15 in amounts necessary to maintain an operating pressure of slightly below fifteen pounds per square inch.

Figure 6:
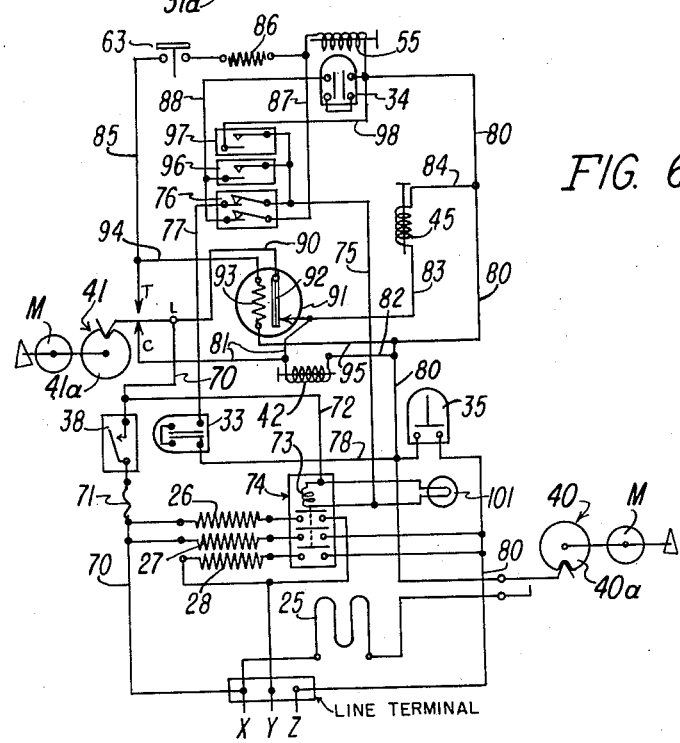
FIG. 6 is a schematic wiring diagram.

A typical cooking operation will be described in connection with the circuit diagram of FIG. 6. It will be assumed that the cooking appliance is being started from a cold condition. The chef operates master switch 38 to the "on" position, whereupon a circuit is established from power terminal X, line conductor 70 and fuse 71, conductor 72 to coil 73 of the triple pole contactor or relay 74, conductor 75, one pole of a double pole, single throw, toggle switch 76 (which is normally in closed condition), conductor 77 to humidity control thermostat 33 (which, because the chamber walls are cool, is in closed circuit condition), conductor 78 to safety thermostat 35 (also closed at this time), and line conductor 80 to power terminal Z. Relay 73 closes its contacts and the respective heating units 26, 27, and 28 become energized through the obvious circuits.

Upon closure of switch 38, exhaust valve solenoid 42 and drain valve solenoid 45 become energized to open their normally closed valves. The circuits for this operation may be traced from conductor 70 to the intermediate switch spring L of timer 41, from L to lower switch contact C of said timer, said spring and contact being closed when the timer is at a "zero" position, and open whenever the timer dial is moved to a cooking time setting, and then by way of conductor 81 to solenoid 42, and conductor 82 to conductor 80 and power terminal Z. The drain solenoid 45 becomes energized by way of conductors 81, 83, and 84, thereupon to conductor 80 and terminal Z.

After about four minutes, the chef operates the setting knob of the timer 41 to the desired cooking time and sets the humidity control thermostat to the "high humidity" (lower temperature) or to the "low humidity" (high temperature) setting. In passing, it should be understood that leafy vegetables such as cabbage, or vegetables having bud-like forms such as broccoli are cooked best at high humidity conditions, for the delicate edges and stems of these vegetables might be scorched in the high temperature, low humidity atmosphere. On the other hand, meats and potatoes are best cooked in the low humidity atmosphere.

Timer 41 is schematically illustrated as of the spring clock type, in which rotation of a setting knob rotates the cam 41a from its "zero" position and starts the clock M, which thereupon returns the cam to the "zero" position during the cooking interval. Rotation of timer cam 41a to any operating position opens the switch contacts L and C thereof and closes switch spring L against contact T. A circuit is thus completed for energization of the solenoid 55 of the normally closed water inlet valve 56 as follows: Conductor 70, closed contacts L and T, conductor 85, normally closed pressure switch 63, resistor 86 (of 1220 ohms) water inlet solenoid 55, and conductor 80 to the line terminal. However, if for some reason the bottom wall 15 had not yet reached 305° F., the water inlet thermostat 34 will be in closed circuit condition, whereupon the inlet valve solenoid will be shunted out and cannot receive enough power to open the inlet valve. The shunt circuit is traced by way of closed contacts L and T, closed switch 63 and conductor 87, closed switch 76, conductor 88, the closed contacts of thermostat 34, and conductor 80 to the line. This water inlet control thermostat insures that when water is admitted to the chamber, it will be converted immediately into steam. This removes all danger of flooding the chamber.

It will be observed that for the exhaust solenoid 42 and the drain valve solenoid 45, there are two parallel energizing circuits. The first, already described, including the originally closed contacts L and C of the timer 41, and the conductors 81 and 82 for the exhaust valve solenoid, and 81 and 83 for the drain valve solenoid. This circuit is interrupted when the setting of the timer opens contacts L and C thereof. The second circuit comprises conductor 70, contact L of the timer, conductor 90 connected thereto, the normally closed contacts of a conventional thermally-actuated time-delay relay 91, conductors 83, 84, and 80 for drain solenoid 45, and conductors 81, 82, and 80 for exhaust solenoid 42. Relay 91 comprises a bimetal switch arm 92 closed against its associated switch contact when cool, and a heating coil 93 which, when energized, heats switch arm 92 to cause it to flex into an open circuit position.

At this time, steam is being generated in the chamber, whereupon the initial air content of the chamber is being evacuated by the discharge of steam through the exhaust valve 43 and the drain valve 46. Equally importantly, the condensate pan 51 and the drainage valve and piping associated therewith are being scoured by live steam. With the closing of contacts L and T of the timer 41, a time-delay heating coil operating circuit was established, comprising conductor 70, contacts L and T, conductor 94, heating coil 93, and conductors 95 and 80 to line. The time-delay relay 91 is set for opening the switch contacts after the heating coil 93 has been energized for approximately thirty seconds. Upon the opening of the time-delay relay contacts, the second of the energizing circuits for the exhaust valve solenoid and the drain valve solenoid is broken and the respective valves associated therewith return to their normally closed condition. It will be understood that the heating coil 93 of the time-delay switch remains energized throughout the cooking operation, whereupon the energizing circuits for the exhaust valve and the drain valve remain open.

It is obvious that with the water inlet thermostat above its setting point during the cooking operation, the water inlet solenoid 55 is under the control of the pressure switch 63. The valve remains open, admitting water until the steam pressure within the chamber attains approximately thirteen pounds per square inch, whereupon the pressure switch opens the circuit to deenergize the water valve solenoid. The operation of the water valve then becomes dependent on the rate at which steam condenses on the foodstuffs and the condensate is withheld from striking the steam generating bottom wall 15 of the cooking chamber. A heavy load of potatoes, for example, about thirty pounds, will require more inlet water, for the steam condenses on the load and will be caught by the condensation pan and not be returned to the steam condition. A single pan of peas of the order of from four to six pounds is the lightest normal load and comparatively little "make-up" water is required to maintain the proper steam pressure. In any event, it is seldom that more than two to three pounds of water are required during a normal cooking operation.

The interior temperature of the cooking chamber is dependent on the setting of the humidity control thermostat, as will be understood, for the thermostat cycles the main relay 74 to maintain the temperature of the wall 15 within the permitted tolerance at the selected setting of the thermostat. The water inlet thermostat remains open during the entire cooking operation, for its setting temperature, approximately 305° F. is adequately below the lowest cycling temperature of the humidity thermostat. The safety thermostat 35 remains closed, unless, because of failure of the humidity thermostat, the heating units remain energized.

It will be noted that the bulb 30 of the humidity control thermostat is the most distant from the inlet water spray fitting and, therefore, where the bottom of the chamber tends to be hottest and most responsive to the cooling effect of the water. If the spray pattern became inadequate for some reason, the thermostat would limit this "hottest" area to normal operating temperature.

At the end of the cooking operation, the timer contacts L and T open, breaking the water inlet solenoid circuit and interrupting the heating coil circuit of the time-delay relay. However, as timer 41 returns to "zero" time, contacts L and C return to closed position, restoring the previously traced circuit for energizing the drain valve solenoid and the exhaust valve solenoid. The steam is quickly vented and the chef may open the door for the removal of the cooked foodstuffs. In a busy kitchen, it is probable that the chef may wish to reload the cooker immediately, whereupon he will not open the main switch 38. If, however, he should delay in restoring the cooker to operation by operation of the time switch, the continued energy input of the heating units would quickly raise the bottom wall temperature to the cut-out point of the humidity control thermostat 33, whereupon the relay coil 73 will be de-energized and the heating unit circuit broken.

At any time during or after the pressure cooking operation, the chef may energize the upper heating element 25 by appropriate operation of the timer 40. This completes the upper heating unit circuit across line terminals X and Z, as is obvious from FIG. 6. It will be noted that the upper heating unit may not be energized if the safety thermostat 35 is in open circuit condition.

In the present commercial form of the invention, the heating units 26, 27, and 28 each draw four kilowatts of energy; and the upper unit 25, draws about 1.65 kilowatts. The massive bottom wall has large heat capacity and "flywheel" effect, but the heating units nevertheless bring the wall to proper operating temperature in about four minutes. After one cooking operation is completed, the chef may immediately place quantities of raw food in the chamber, and the new cooking operation will begin almost immediately.

Means are provided to permit checking and calibrating the thermostat operation in the field. It will be recalled that switch 76 was identified as a double-throw, single pole, toggle switch. This switch is mounted in close relation to (see FIG. 5) a first single pole, single-throw, toggle switch 96, and a second single pole, single-throw, toggle switch 97, all mounted on a suitable bracket and accessible upon removal of the side wall access panel (not shown) which makes available for inspection and replacement all of the control valves and devices previously discussed. As shown in FIG. 6, a common terminal of each of the switches 96 and 97 and the similar terminal of one of the poles of switch 76 are bridged to conductor 75. A common terminal of switch 96 and the same terminal of the other pole of switch 76 are bridged to the conductor 88. A terminal of switch 97 is connected by means of conductor 98 to the line conductor 80.

Figure 7:
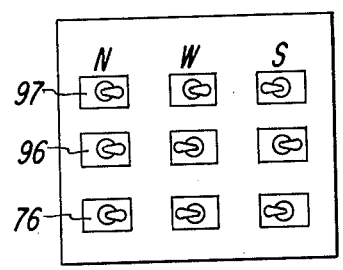
FIG. 7 is a schematic view to show the arrangement of certain switches during thermostat calibration operations.

FIG. 7 is a schematic representation illustrating in three columns, respectively identified as N, W, and S, the positions of the toggle switch actuators under various conditions of normal operation and for thermostat calibration. Column N represents the switch condition for normal operation and for calibrating the humidity control thermostat 33. The toggle positions establish both poles of switch 76 in closed circuit condition, and the single pole of switches 96 and 97 in open circuit condition. Column W shows the toggle positions for making a calibration check of the water inlet thermostat 34; both poles of switch 76 are open, switch 96 is closed, and switch 97 is open. Column S shows the toggle positions for checking and calibration of the safety thermostat; both poles of switch 76 are open, switch 96 is open, and switch 97 is closed.

A screw 100 (FIG. 2) is provided in the bottom wall 15 of the cooking chamber to facilitate the attachment of a calibration device such as a thermocouple (not shown).

Thermostat calibration is made with the chamber door open, the chamber empty (without food therein) and without the use of water. To test the humidity control thermostat 33, it is necessary only to close the master switch 38. The relay coil will energize the heating units through the previously described circuit, and the temperatures at which the thermostat cycles between its normally closed and its open positions may be observed by watching the pilot light 101 which is bridged across the coil 73.

To test the water inlet thermostat, the toggles are arranged as previously described, in which only the switch 96 is closed and the humidity control thermostat circuit is shunted out. The circuit to the heating unit relay coil 73 is completed by way of line conductor 70, conductors 72 and 75, switch 96, conductor 88, thermostat 34, and line conductor 80. Again, the operation of the thermostat may be observed by means of the pilot light 101.

To test the safety thermostat 35, the toggles are according to column "S" pursuant to which only switch 97 is closed. This shunts out both the humidity control thermostat 33 and the water inlet thermostat 34, whereupon the circuit to the heating unit relay coil 73 is completed by way of line conductor 70, conductors 72 and 75, switch 97, and conductors 98 and 80 to the thermostat 35. Once again, the operation of the thermostat 35 may be observed by watching the periods of illumination and extinguishment of the pilot light 101.

It has been noted that the sensing elements 30, 31 and 32 of the thermostat systems are snugly housed in tubes 29 cast into the base wall 15 of the cooking chamber. The tubes are open at the front, making it a simple matter to withdraw the sensing elements when the thermostats are to be repaired or replaced. To facilitate access to the sensing elements and to the terminals of the heating units, the casing 12 is provided with removable access plates P. The elongated sensing elements may be formed in a slightly undulating shape to improve the contact thereof with the wall of the tubes 29.

While there has been described what is at present considered to be the preferred embodiment of the invention, it will be understood that various modifications may be made therein, and it is intended to cover in the appended claims all such modifications as fall within the scope of the invention.

We claim:

1. A cooking appliance, comprising, in combination, a cooking chamber having a closure; a first electrical heating unit within said chamber in an upper portion thereof; a second electrical heating unit disposed wholly externally of said cooking chamber in good heat transfer relation to the base wall of said chamber; a water inlet system for introducing water into said chamber, said inlet system including a spraying device within said chamber for distributing said water over a substantial area of said base wall; a first thermostat means for controlling electrical energy to said second named heating unit to maintain the said base wall at a temperature whereby water impinging thereon will be converted to steam at above atmospheric pressure; a second thermostat means for controlling flow of water through said water inlet system to delay introduction of water into said chamber until the base thereof is at a temperature sufficient to convert said water into steam; a first time-controlled switch for energizing said first-named heating unit for a predetermined period; a second time-controlled switch for energizing said second-named heating unit for a predetermined period, said time switches being arranged for individual or conjoint operation; and a third thermostat means for de-energizing the said heating units in the circumstance said base wall attains a predetermined temperature.

2. A cooking appliance comprising, in combination, a chamber for processing foodstuffs in a steam atmosphere at substantially above atmospheric pressure, said cooking chamber including a wall openly facing the interior thereof; electrical heating means in good heat transfer relation to said wall; a water inlet system having an electrically operated valve for introducing water into said chamber for impingement against said wall; an electric circuit for energizing said heating means to raise the temperature of said wall substantially above the temperature at which water impinging thereon will be converted into steam; a drainage system for said chamber, said system including a normally closed valve; an electric circuit including an electrically operable valve actuator effective when energized to operate said drain valve to open position; an exhaust system for said chamber, said system including a normally closed valve; an electric circuit including an electrically operable valve actuator effective when energized to operate said exhaust valve to open position; a master switch for simultaneously applying electric power for energizing said heating means and each of said drain valve and exhaust valve actuators and for preparing an energizing circuit for said electrically operated water valve; a timing device operable from a zero time position to establish a desired cooking time and returning to said zero time position at the expiration of said cooking time; means including a normally open switch operable to closed position by movement of said timing device from zero time to a cooking time position to complete the energy circuit for opening said water inlet valve; electric circuit means completed by closure of said timing device actuated switch to de-energize said drain valve and said exhaust valve actuators to effect closure of the said valves after a predetermined interval following operation of said timing device to a cooking time position and to maintain said de-energized condition until the return of said timing device from its cooking time position to its zero time position; and electric circuit means energized upon return of said timing device to zero time position to re-energize said drain valve and exhaust valve actuators to reopen said valves upon return of said timing device to zero time position.

3. A cooking appliance comprising, in combination, a chamber for processing foodstuffs in a steam atmosphere substantially above atmospheric pressure; a thermally conducting wall openly facing the interior of said chamber; electrical heating means disposed in good heat transfer relation to said wall; a water inlet system for introducing water into said chamber for impingement against said wall; an electric power circuit for energizing said heating means to raise the temperature of said wall above that at which the water impinging thereon will be converted to steam; a normally closed drain valve for said chamber; solenoid means effective when energized to open said drain valve; an energizing circuit for said solenoid means; master switch means for conjointly energizing said heating means and said solenoid circuit; normally closed switch means in said solenoid circuit in series relation with said master switch means; electrically energized means for opening said series-related switch means after a predetermined interval; a timing device operable from a zero time position to a desired cooking time position; and time switch means in series with said master switch means and said switch opening means, said time switch means being operated by said timing device from a normally open position at zero time position to a closed circuit condition when said timing device is operated to any cooking interval position, whereby said drain valve opens upon energization of said solenoid circuit concurrently with the energization of said heating means circuit and returns to closed position upon the opening of said solenoid circuit switch means at a predetermined interval following the operation of the timing device to a cooking interval position.

4. A cooking device comprising, in combination, a chamber for processing foodstuffs in a steam atmosphere substantially above atmospheric pressure, said chamber having a bottom wall of good heat-conductive material, said wall being appreciably heavier than the remaining walls of said chamber; electrical resistance means embedded in said bottom wall to heat the same, the mass of said bottom wall giving a substantial heat absorption capacity thereto; a water inlet system for introducing water into said chamber for conversion into steam therein, said inlet system including a first thermostat responsive to the temperature of said bottom wall to delay introduction of water into said chamber until said bottom wall has attained a predetermined minimum temperature; means for maintaining a desired operating steam pressure within said chamber; and means including a second thermostat responsive to said bottom wall temperature and optionally settable to maintain the same in either of two optional temperature ranges of which the minimum point of the lower of the two temperature ranges is substantially greater than the temperature of saturated steam at the said desired operating pressure, and the minimum point of the higher of the two optional temperature ranges is substantially greater than the maximum point of said lower temperature range.

5. A cooking appliance, comprising a pressure chamber for accommodating foodstuffs to be processed; means including an electric circuit and electric heating means therein in good heat transfer relation to a wall having a surface within said chamber whereby to heat said wall to a temperature substantially above the vaporization temperature of water at a desired pressure within said chamber; a water inlet system including an operating circuit, an electrically operated water valve therein, and an outlet for directing water against said wall surface for generating steam within said chamber; a chamber drainage system including an electrically opened, normally closed, drainage valve; a chamber exhaust system including an electrically opened, normally closed, exhaust valve; an operating circuit for each of said valves; a first switch means common to said electric heating circuit and said valve operating circuits for simultaneously energizing said heating means and said valve operating circuits for opening the drainage valve and the exhaust valve; a second switch means operable when closed to prepare said operating circuit for said water valve; a thermostat responsive to the attainment of a predetermined temperature of said wall to complete the water valve operating circuit to open the valve for the said generation of steam; a third switch means in circuit with said second switch means and the operating circuits for said drainage and exhaust valves to de-energize said operating circuits to close said valves after an interval following the closure of said second switch means; and timing means operable after a preselected time interval to open said second switch means to interrupt said water inlet system operating circuit, and to restore the operating circuits reopening the drainage and the exhaust valve.

6. A cooking appliance, comprising a pressure chamber for accommodating foodstuffs to be processed; means including a heating device and an electric circuit for controlling the operation thereof for heating a wall of said chamber to a temperature substantially above the vaporization temperature of water at a desired pressure within said chamber, a water inlet system including an operating circuit, an electrically operated water valve therein, and means for discharging water against said wall for the generation of steam within said chamber; a chamber drainage system including an operating circuit and an electrically operated drainage valve therein; a chamber exhaust system including an operating circuit and an electrically operated exhaust valve therein; a first switch means common to said heating circuit and said valve operating circuits for simultaneously energizing said heating device control circuit to activate said heating means and said valve operating circuits for opening the drainage valve and the exhaust valve; a second switch means operable when closed to energize said operating circuit for opening said water valve to effect flow of water against said heated wall; a third switch means in the operating circuits for said drainage and exhaust valves; means initiated by the closure of said second switch means to operate said third switch means to close said valves after an interval; and timing means operable after a preselected time interval to close said water inlet valve and to restore the operating circuits reopening the drainage and the exhaust valve.

7. A cooking appliance, comprising a pressure chamber for accommodating foodstuffs to be processed; means including an electric circuit and electric heating means to heat structure within said chamber to a temperature substantially above the vaporization temperature of water at a desired pressure within said chamber; a water inlet system including an operating circuit, an electrically operated water valve therein, and means for discharging water against said structure for the generation of steam within said chamber; a chamber drainage system including an operating circuit and an electrically operated exhaust valve therein; a first switch means for simultaneously closing said heating means circuit and actuating the operating circuit for closing the exhaust valve; a second switch means operable when closed to prepare said operating circuit for said water valve; a first thermostat responsive to a predetermined temperature of said chamber structure to complete the water valve operating circuit to open the valve for the generation of steam; a third switch means in the operating circuit of said exhaust valve; first timing means initiated by the closure of said second switch means to operate said third switch means to close said valve after an interval; second timing means operable after a preselected time interval to close said water inlet valve and to restore the operating circuits reopening the drainage system and the exhaust valve; and a second thermostat responsive to a predetermined temperature condition of said chamber structure to close said water inlet valve, said second thermostat being in an overriding relationship to said first thermostat and said second timing means.

References Cited in the file of this patent

UNITED STATES PATENTS

| | | |
|---|---|---|
| 1,580,293 | Fitzer | Apr. 13, 1926 |
| 1,702,854 | Simonds | Feb. 19, 1929 |
| 2,112,639 | Underwood | Mar. 29, 1938 |
| 2,194,117 | Graham | Mar. 19, 1940 |
| 2,208,552 | Walter | July 16, 1940 |
| 2,538,567 | Jones | Jan. 16, 1951 |
| 2,719,211 | Lewis et al. | Sept. 27, 1955 |
| 2,750,937 | Sjolund | June 19, 1956 |
| 2,766,366 | Eckhoff | Oct. 9, 1956 |
| 2,806,123 | Steinbock | Sept. 10, 1957 |
| 2,920,179 | Shaw | Jan. 5, 1960 |

FOREIGN PATENTS

| | | |
|---|---|---|
| 700,110 | Great Britain | Nov. 25, 1953 |